United States Patent
Vambaris et al.

[11] Patent Number: 5,930,707
[45] Date of Patent: Jul. 27, 1999

[54] SYSTEM FOR REMOTELY TESTING A CELLPHONE BASE STATION

[75] Inventors: Peter Vambaris, Punchbowl; Moscos Manolakis, Turrella, both of Australia

[73] Assignee: Alcatel N.V., Rijswijk, Netherlands

[21] Appl. No.: 08/720,000

[22] Filed: Sep. 25, 1996

[30] Foreign Application Priority Data

Oct. 4, 1995 [AU] Australia ................................. PN5763

[51] Int. Cl.⁶ ..................................................... H04Q 7/34
[52] U.S. Cl. ............................ 455/424; 455/67.4; 379/27
[58] Field of Search .................................. 455/423, 424, 455/425, 524, 67.1, 67.3, 67.4; 379/5, 23

[56] References Cited

U.S. PATENT DOCUMENTS

| | | | |
|---|---|---|---|
| 4,977,399 | 12/1990 | Price et al. | 455/424 |
| 5,095,500 | 3/1992 | Tayloe et al. | 455/424 |
| 5,289,526 | 2/1994 | Chymyck et al. | 455/67.1 |
| 5,357,557 | 10/1994 | Sakakura | 379/27 |
| 5,490,204 | 2/1996 | Gulledge | 455/424 |

*Primary Examiner*—Edward F. Urban
*Attorney, Agent, or Firm*—Ware, Fressola, Van Der Sluys & Adolphson LLP

[57] ABSTRACT

To enable testing of lightly loaded, remote base stations 2, a mobile phone 3 located within the cell is programmed to dial a test number via the public switched telephone network (PSTN). The test number generates an audio signal, e.g. a fixed tone which is transmitted to the mobile phone. A test unit 4 is connected to the mobile phone and initiates the test program and monitors receipt of the audio signal. Test unit 4 includes control logic 5 connected via a communication link 54 to a base station 2, and via lines 51, 52, 53 to phone 3. A tone monitor 7 tells control logic 5 whether a radio downlink test tone has been received, and the result is stored in a memory 11. A second tone generator 8 can be actuated by control logic 5 to test a radio uplink from phone 3 to base station 2.

16 Claims, 2 Drawing Sheets

SYSTEM FOR REMOTELY TESTING A CELLPHONE BASE STATION

TECHNICAL FIELD

This invention relates to a Remote Call Generator (RCG) for testing radio access communication equipment such as GSM (Global System for Mobile telecommunications) base stations.

BACKGROUND OF THE INVENTION

In a radio access system or a cellular radio base station such as a GSM Base Transceiver Station (BTS) a lightly loaded remote BTS may appear quiescent to a central monitoring position either because of an absence of traffic or because of a fault in the station. There is thus a need to be able to initiate a test when a BTS appears inactive to determine whether the BTS is faulty or not.

DISCLOSURE OF THE INVENTION

This invention provides a radio access test unit for testing, in conjunction with a first transceiver, the operation of a radio access base transceiver station (BTS), the test unit including first control means, responsive to a first start instruction received from a remote control station via a first communication link, to cause the first transceiver to transmit a predetermined signal to the BTS to set up a radio link to a first test signal generator, which transmits a first test signal via the radio link to the test unit, the test unit including monitor means to monitor reception of the test signal and to generate error signals when the test signal is not correctly received.

Preferably the test unit includes test analyzing means to analyze the error signals and to generate an alarm signal when the error signal exceeds a predetermined limit.

In a preferred embodiment the test unit is used for testing a mobile telephone base station and the predetermined signal is a telephone number which accesses a test tone generator and the radio link is a mobile telephone link.

Basically the invention includes a monitoring arrangement including a processor to control a transceiver capable of initiating an upstream test call to at least one predetermined number on an uplink via a BTS under test, the predetermined number accessing first tone generator means arranged to transmit a first tone signal via a downlink corresponding to said uplink to the transceiver, first monitor means to detect reception of the first tone signal and to inform the processor of reception of the first tone signal, the processor recording an error when the first tone signal is not received in response to the initiation of a call. The processor causes a record of the test results to be stored in a memory.

The processor is connected to communication means whereby the test results can be communicated to a central control station.

Preferably the transceiver is a mobile telephone subset.

Preferably the processor analyses the test results and transmits an alarm signal to the central control station when the error rate exceeds a predetermined level.

Preferably, the test unit and test transceiver are powered from a reliable power supply, such as the BTS power supply or any other form/source of power supply.

The operation of the monitoring arrangement is controllable from the central control station via a communication link. This control may make use of the existing BTS/OAMC (Operations and Maintenance Center) link.

In a further embodiment of the invention a downstream test call may be initiated from the central control station by dialling the transceiver via the mobile telephone network, the transceiver being connected to second tone generator means which is initiated in response to the reception of the downstream test call by the transceiver to generate a second tone signal which is applied to the transmit circuit of the transceiver, and wherein the central control station has second monitor means to detect reception of the second tone signal and to indicate an error if the second tone signal is not received in response to a downstream test call.

BEST MODE OF CARRYING OUT THE INVENTION

Figure 1:
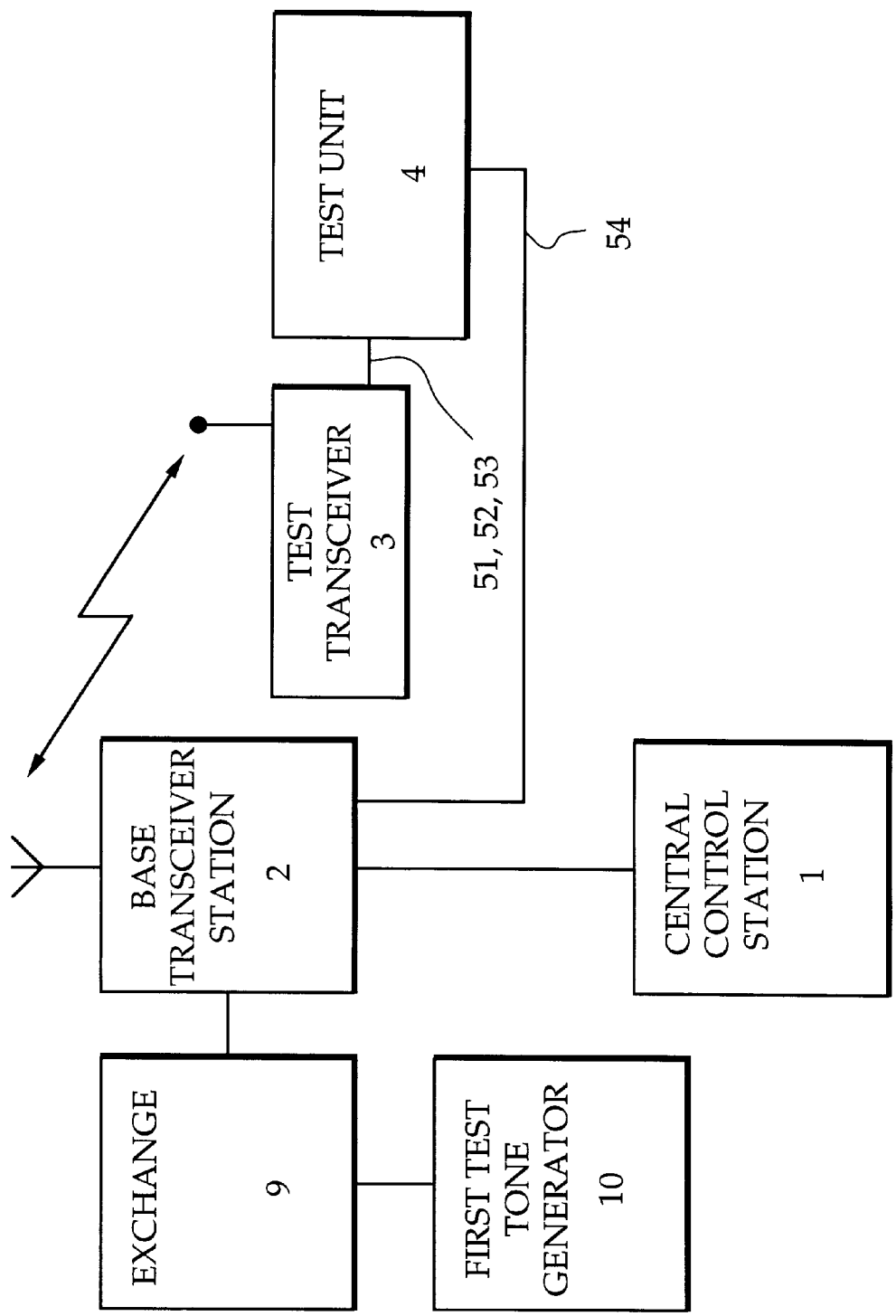
FIG. 1 schematically illustrates an arrangement embodying the invention.
Figure 2:
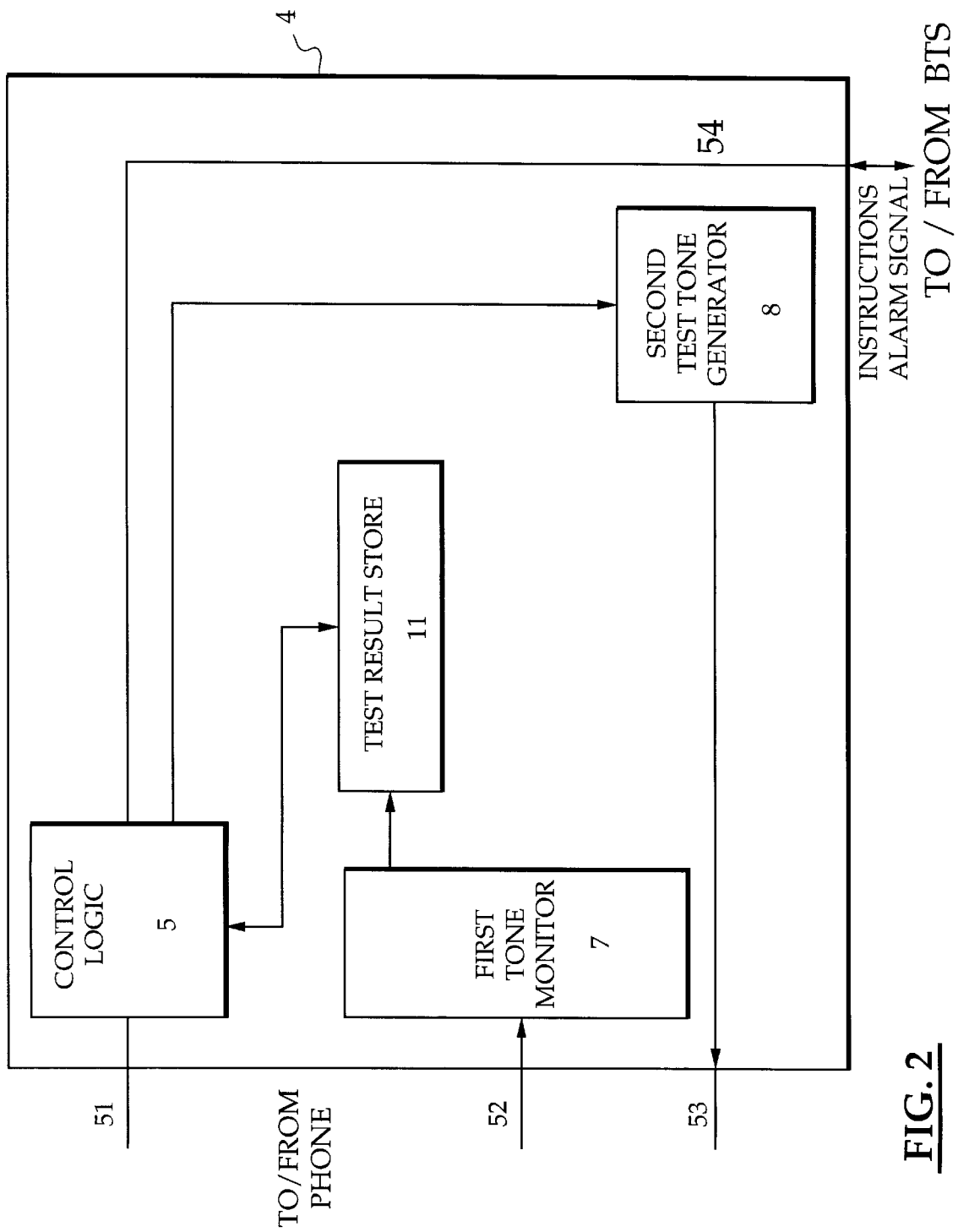
FIG. 2 is a block diagram of the test unit.

The central or remote control station, 1, is connected to a number of base transmission stations BTS, 2, only one of which is shown via a communication link such as an optical fiber, microwave link or other suitable link.

The BTS is also connected into the fixed telephone network e.g. via the exchange 9.

At the BTS2 there is provided a transceiver 3 (preferably a mobile phone) able to make radio contact with the BTS2 as if it were a mobile phone in the coverage area of the BTS.

The transceiver 3 is connected to a test unit 4 which includes a processor or control logic 5. The test unit 4 includes a first tone monitor 7 to monitor a first tone signal received via the transceiver 3. The test unit 4 causes the transceiver 3 to initiate a call via the exchange 9 to a predetermined telephone number.

Preferably, the predetermined telephone number provides access to a predetermined signal, e.g. tone generator 10, which can be recognized by the monitor unit.

Thus the processor or control logic 5 is arranged to cause the transceiver 3 to dial out the predetermined number in response to an instruction to the test unit 4 from the central or remote control station 1 via the communication link to BTS2 and then via line 51 to test unit 4.

Preferably, the transceiver 3 is a mobile phone which contains a register in which the predetermined number is stored and the processor or control logic 5 is arranged to produce a signal which it sends to the phone 3 and which initiates the dialling out of the stored number, e.g. by substituting for the operation of the appropriate memory button of the phone 3.

The mobile phone 3 then establishes radio communication with the BTS2, e.g., by transmitting a GSM access burst in the control channel of the BTS time frame and the BTS sends a signal advising the phone 3 of an available uplink channel. The phone 3 then dials out the predetermined number in its allotted channel and the BTS2 sends this information e.g., over a land line to the exchange 9 which establishes the appropriate connection, which in this case is to the first test tone generator 10. The first tone is sent to the BTS2 via the exchange 9 which digitizes the received tone and transmits it to the phone 3 on the corresponding downlink channel. The phone 3 then converts the received signal to an analog signal and this is fed to the test unit 4 via line 52 where it is applied to a monitor circuit 7, e.g., a band pass filter and amplitude measuring circuit, which verifies that the first tone has been received correctly at a level above background noise. After the predetermined time the phone 3 disconnects the call.

If the first tone is not received within a predetermined time which allows for call set up and signal transmission, an error signal is generated by the test unit. The error signal is generated by the test unit. The error signal may be stored in store 11 in the test unit with a number of other test results and an alarm signal generated for transmission via line 54 and the BTS/CCS link to the central control station 1 if the error rate exceeds a predetermined limit. For example testing could be carried out at a rate of one call per minute and if more than a pre-determined number of errors are recorded in a given time, an alarm signal is generated.

This test provides a means of verifying the down-link operation.

Uplink operation may be tested in a similar manner by including a second test tone generator, 8, located this time in the test unit.

The CCS1 initiates a call to the phone 3 via the BTS 2 radio link. The reception of the call by the phone 3 automatically initiates the generator 8 via control means 5 which causes a second test tone to be injected via line 53 into the analog portion of the phone's transmission path e.g. in the microphone output circuit.

The phone 3 then transmits the second test tone on its uplink channel to the BTS2. A similar analysis of the success of the uplink transmission either at the BTS2 or the CCS1 results in an error signal being generated when the error rate exceeds a set level.

In an alternative arrangement, the test unit causes the mobile subset to dial a number which loops the speech path. The test unit then generates its own test signal which the subset transmits on the uplink and which is subsequently received by the mobile on the downlink and fed to the test unit for verification.

In a further variation, test call is set up as a data call, and a data signal used instead of the tone signal. This arrangement has the advantage of enabling the quality of the link to be tested by measuring the bit-error rate.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A radio access test unit for testing the operation of a cellular telephone access base transceiver station (BTS) in a telephone network, the test unit including
    a test transceiver; control means controlling the test transceiver; and monitor means to monitor signals received by the test transceiver;
    wherein the test unit is located at or proximate to the base station, the test unit being connected to a remote control station via a first communication link whereby instructions to initiate a test are transmitted from the control station to the test unit;
    wherein the test transceiver includes a test antenna located within a coverage area of the base transceiver station, whereby the control means causes the test transceiver to establish a radio link with the base station;
    the test transceiver including a storage containing a predetermined number which the test transceiver dials to establish a telephone link to a first test signal generator whose location in the network is identified by the predetermined number;
    the monitor means monitoring signals received by the test transceiver and generating an error signal when the signal from the first test signal generator is not correctly received.

2. A test unit as claimed in claim 1, including test analyzing means to analyze the error signal and generate an alarm signal when the error signal exceeds a predetermined limit.

3. A test unit as claimed in claim 2, wherein the analyzing means is located with the test unit and the alarm signal is transmitted to the control station.

4. A test unit as claimed in claim 2, wherein the error signals are transmitted to the remote control station and wherein the analyzing means are located at the remote control station.

5. A test unit as claimed in claim 2, wherein the first test signal generator is accessed via the public switched telephone network, to which the base transceiver station (BTS) is connected via a second communication link.

6. A test unit as claimed in claim 1, for use in a mobile telephone system, wherein
    the predetermined signal is a telephone number which accesses the test signal generator via a public switched telephone network and wherein the radio link is a mobile telephone link.

7. A test unit as claimed in claim 6, wherein the predetermined limit is stored in a memory in the first transceiver.

8. A test unit as claimed in claim 6, including a second test signal generator, and wherein the control means is responsive to an incoming call to cause the test transceiver to transmit a second test signal from the second test signal generator via said mobile telephone link to the remote control station.

9. A test unit as claimed in claim 6, wherein the test unit includes a second test signal generator which generates a second test signal which is transmitted via the test transceiver and the radio link to a speech path loop circuit,
    whereby the second test signal is retransmitted via the radio link to the test transceiver and fed to the test unit for analysis.

10. A test unit as claimed in claim 6, wherein the first test signal is a data signal.

11. A test unit as claimed in claim 10, including bit error rate measuring means.

12. A test unit as claimed in claim 11, wherein the bit error rate is used to measure the quality of the radio link.

13. A remote test arrangement for a mobile telephone base transceiver station (BTS), the arrangement including:
    a test unit;
    a remote control station;
    the test unit including a test transceiver, control means controlling the test transceiver, and monitor means to monitor signals received by the test transceiver,
    wherein the test unit is located at or proximate to the base station, the test unit being connected to the remote control station via a first communication link whereby instructions to initiate a test are transmitted from the control station to the test unit;
    wherein the test transceiver includes a test antenna located within a coverage area of the base transceiver station, whereby the control means causes the test transceiver to establish a radio link with the base station:
    the test transceiver including a storage containing a predetermined number which the test transceiver dials to establish a telephone link to a first test signal generator whose location in the network is identified by the predetermined number;

the monitor means monitoring signals received by the test transceiver and generating an error signal when the signal from the first test signal generator is not correctly received, the test unit including test analyzing means to analyze the error signal and generate an alarm signal when the error signal exceeds a predetermined limit.

14. An arrangement as claimed in claim 13, wherein the analyzing means are located at the remote control station.

15. An arrangement as claimed in claim 13, wherein the analyzing means are located at the test unit.

16. An arrangement as claimed in claim 13, wherein the remote control station is adapted to generate a second command signal to cause the test unit to transmit a second test signal via the test transceiver, and wherein the remote control station includes monitor means which verify receipt of the second test signal and generate an error signal if the expected second test signal is not received correctly, the remote control station including analyzing means which analyze the results of the second command signal and generate an alarm signal if the error rate exceeds a predetermined limit.

* * * * *